United States Patent [19]
Holzinger et al.

[11] Patent Number: 5,222,110
[45] Date of Patent: Jun. 22, 1993

[54] ELECTRONIC COUNTER FOR COUNTING PERIODIC CLOCK SIGNAL GENERATED AT PRESET CLOCK FREQUENCY

[75] Inventors: Otto Holzinger, Eschenbach; Wolfgang Borst, Schwieberdingen; Martin Klenk, Backnang; Wolfgang Loewl, Marbach; Erich Breuser, Vaihingen/Enz; Thomas Goelzer, Schwieberdingen; Otto Karl, Leonberg-Hoefingen; Martin Streib, Stuttgart; Mathias Lohse, Gerlingen; Frieder Keller, Ubstadt-Weiher, all of Fed. Rep. of Germany

[73] Assignee: Robert Bosch GmbH, Stuttgart, Fed. Rep. of Germany

[21] Appl. No.: 828,931
[22] PCT Filed: Jul. 12, 1990
[86] PCT No.: PCT/DE90/00524
§ 371 Date: Jan. 31, 1992
§ 102(e) Date: Jan. 31, 1992
[87] PCT Pub. No.: WO91/03015
PCT Pub. Date: Mar. 7, 1991

[30] Foreign Application Priority Data

Aug. 24, 1989 [DE] Fed. Rep. of Germany ....... 3927967

[51] Int. Cl.⁵ .................................................. G06F 7/38
[52] U.S. Cl. .......................................... 377/44; 377/16; 377/47; 377/48; 377/50
[58] Field of Search ....................... 377/44, 16, 47, 48, 377/50

[56] References Cited

U.S. PATENT DOCUMENTS

| 4,017,719 | 4/1977 | Kaplan et al. | 377/44 |
| 4,471,170 | 9/1984 | Akram | 377/44 |
| 4,741,002 | 4/1988 | Dougherty | 377/44 |
| 5,066,927 | 11/1991 | Dent | 377/48 |

Primary Examiner—William L. Sikes
Assistant Examiner—Scott A. Ouellette
Attorney, Agent, or Firm—Michael J. Striker

[57] ABSTRACT

The electronic counter for counting a periodic clock signal generated at a preset clock frequency ($f_o$) includes a clock circuit generating the periodic clock signal at the preset clock frequency ($f_o$); an adjustable frequency divider (4) having an output (8), a first input (5) and a second input (7), the first input of the frequency divider (4) being connected to the clock circuit (6) so as to receive the periodic clock signal and the second input (7) of the frequency divider being connected to receive a cycle speed signal (n), the frequency divider (4) containing means to produce a pulsed output signal at a divider output frequency ($c_o$); a tracking circuit (T) connected to the output (8) of the frequency divider (4) to receive the pulsed output signal at the divider output frequency ($c_o$) and having a correction signal input for receiving a positive or negative correction signal (KS), the tracking circuit (T) acting to add a number of additional pulses to the pulsed output signal received thereby when the correcting signal is positive and suppressing a number of the pulses of the pulsed output signal from the frequency divider when the correcting signal is negative; and a counting circuit (14) having an output and connected to the tracking circuit (T) to count the pulses received from the tracking circuit and to generate a counter reading ($z_s$). The divider output frequency ($c_o$) is substantially equal to the clock frequency ($f_o$) divided by a factor (T) equal to a constant (K) depending on the frequency divider (4) and the cycle speed signal (n).

8 Claims, 1 Drawing Sheet

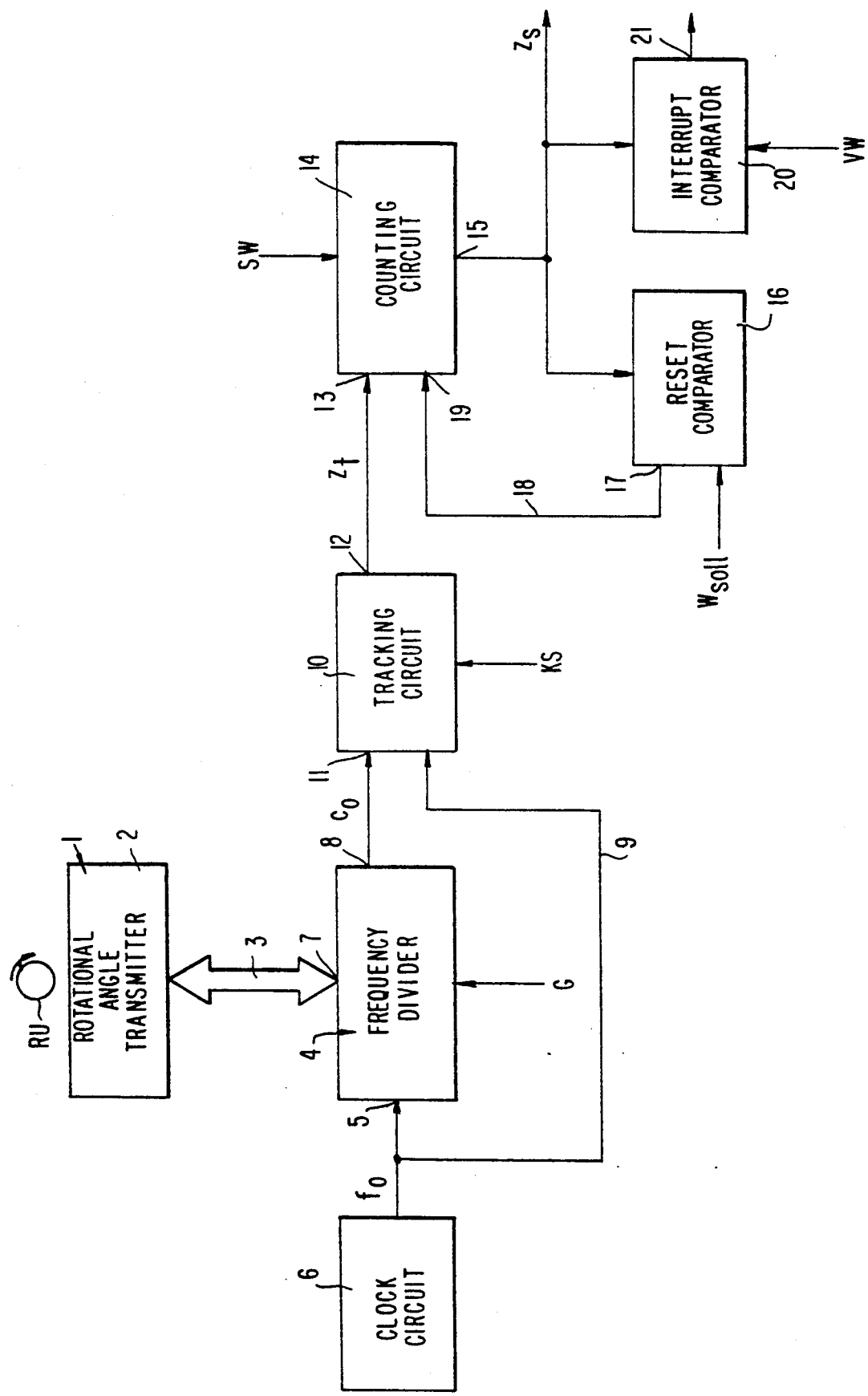

ELECTRONIC COUNTER FOR COUNTING PERIODIC CLOCK SIGNAL GENERATED AT PRESET CLOCK FREQUENCY

BACKGROUND OF THE INVENTION

The invention is related to an electronic counter with a counting circuit and a frequency divider connected upstream of the latter.

Electronic counters are used in many areas of technology. They serve to comprehend a constantly repeating process quantitatively. The counting function is triggered by applying an event-dependent clock frequency to the input of a counting circuit belonging to the counter. To the extent that an event is to be evaluated a frequency divider is connected prior to the counting circuit. As a result of this, the clock frequency is reduced in a fixed preset ratio so that the counting circuit counts correspondingly "slower". Such a counter can be adapted on an individual basis to its respective area of use as a result of the frequency divider connected upstream. However, insofar as a retuning or continuous adaptation is required during use the described known counter is not suitable.

SUMMARY OF THE INVENTION

According to the invention, the electronic counter for counting a periodic clock signal generated at a preset clock frequency includes a clock circuit generating the periodic clock signal at the preset clock frequency; an adjustable frequency divider having an output, a first input and a second input, the first input of the frequency divider being connected to receive the periodic clock signal and the second input of the frequency divider being connected to receive a cycle speed signal; and a counting circuit connected to the frequency divider to count the pulses received therefrom and to generate a counter reading. The frequency divider contains means to produce at the output thereof a pulsed output signal consisting of a plurality of pulses at a divider output frequency, the divider output frequency being substantially equal to the clock frequency divided by a factor depending on a constant and the cycle speed signal.

In contrast, the counter according to the invention has the advantage that its cycle speed is variable. For this purpose it has an adjustable frequency divider which has two inputs. A constant frequency is preferably fed to the first input. This constant frequency is divided by a factor. The magnitude of the factor, i.e. the evaluation, can be preset, as desired, by a cycle speed signal. The cycle speed signal is applied to a second input of the frequency divider in desired time intervals. The factor determining the divider ratio constantly retains its instantaneous value until a change occurs as a result of supplying a cycle speed signal diverging from the instantaneous cycle speed signal. This change leads to a different divider ratio, so that the electronic counter can be adapted individually to its specific area of use, this adaptation also being possible during operation.

According to a further development of the invention it is provided that the frequency is divided by the factor formed from the quotient of a constant and the cycle speed signal. Thus the frequency—which is preferably constant—is multiplied by the cycle speed signal and divided by the constant which is a quantity specific to the circuit. The counter results are accordingly dependent on the frequency on the one hand and on the preset cycle speed signal on the other hand.

It is preferably provided that the frequency fed to the first input is the clock frequency of a clock circuit.

According to another development of the invention the cycle speed signal is digitally preset externally. The error can accordingly be adapted to the individual given circumstances so-to-speak in a "remote controlled" manner.

The invention is further directed to an electronic counter with a counting circuit, a tracking circuit being arranged upstream of the latter. This tracking circuit causes a determined quantity of pulses assigned to it to be suppressed or an additional quantity of pulses to be added as a function of a presettable correction signal. Accordingly a continuous tracking of the counter reading is realized. This ensures that the counting sequence is maintained, i.e. no count values are skipped.

According to a preferred embodiment of the invention the tracking circuit is connected between the frequency divider and the counting circuit. Such a counter accordingly has a variable cycle speed and can be continuously adjusted.

It is particularly advantageous if the counter reading—regardless of the respective existing reading—can be adjusted to a set value which can be externally preset.

The construction can preferably be selected in such a way that the output of the counting circuit is connected to a reset comparator which sends a reset pulse when the counter reading is identical to a presettable reference value and feeds this reset pulse to the counting circuit for resetting the counter reading. A periodicity is accordingly achieved which is adjustable by presetting the reference value. The resetting of the counter which is caused by sending the reset pulse is preferably effected at the "0" counter reading.

Further, it is possible that the output of the counting circuit is connected to an interrupt comparator which transmits an interrupt pulse when the counter reading is identical to a preset comparison value. This transmission can be set by preselecting the comparison value. Individual functions can be triggered at determined counter readings with the interrupt pulse.

According to a preferred embodiment example the counter is connected to a serial data bus. The cycle speed signal is fed via the data bus. This bus connection has the advantage that only a small number of electrical lines is required and that further information, in addition to the cycle speed information, can also be directed via such a data bus.

The subject matter of the invention is further distinguished by a rotational angle transmitter which forms speed data from the angle information of a shaft or the like received from a unit and feeds this, via the data bus, to the frequency divider as cycle speed signal via its second input. The counter accordingly enables a simulation of the rotational angle of the aforementioned unit, i.e. the respective existing counter reading corresponds to a determined rotational angle. Since the speed data are fed into the aforementioned data bus, a plurality of counters connected with the data bus—e.g. at different places or for controlling different functions—can also easily be used, which counters simulate the respective angular positions of the unit. However, only one rotational angle transmitter and only a very low expenditure on cable is required. The information originating from the rotational angle transmitter determines the cycle speed of the counter. This means that the counter, which runs freely per se, is synchronized only occasionally by the cycle speed signal, so that its counter reading showing one angular position agrees with the respective angular position of the unit. The data bus is accordingly hardly loaded, so that its capacity can also be used for other functions.

Such an arrangement is preferably used in motor vehicle electronics. A number of control devices which can be connected in a data bus (CAN=controller area network) are provided for fuel injection and/or ignition. Further, a rotational angle transmitter is provided which detects the angular position of the crankshaft of an internal combustion engine of the motor vehicle and feeds its data, which preferably concerns the speed of the crankshaft, to the data bus. As described, the aforementioned control devices have in each instance a counter according to the invention, so that crankshaft angle information can be made available. Accordingly control devices with their own crankshaft angle sensor can be dispensed with. Only one such sensor (rotational angle transmitter) is needed according to the invention, the sensor being connected with the required number of control devices in a simple manner which economizes on connecting cable as a result of the data bus connection.

Insofar as the aforementioned counter or counters are synchronized to the original angle of the crankshaft and the periodicity is adjusted in such a way that a resetting is effected, e.g. when reaching 360° (or 720° with crankshaft angles of four-cycle engines), the counter reading simulates the original crankshaft angle. A counter working in this way can accordingly also be referred to as an "angle clock".

BRIEF DESCRIPTION OF THE DRAWING

The invention is explained in more detail in the following with reference to the drawing. The drawing shows a block wiring diagram of the electronic counter according to the invention.

DETAILED DESCRIPTION OF THE PREFERRED EMBODIMENTS

The block wiring diagram shown in the drawing has a sensor 1 which is constructed as a rotational angle transmitter 2 and detects the angular position of a crankshaft ru of an internal combustion engine, not shown. The rotational angle transmitter 2 measures the speed of the crankshaft from the time curve of the rotational angle. The speed data formed in this way are fed to a data bus 3 as cycle speed signal n. The data bus 3 is connected to an adjustable frequency divider 4. The latter has two inputs, a first input 5 being connected with a clock circuit 6 and the other, second input 7 being connected to the data bus 3. Further, the frequency divider 4 has an output 8.

The clock circuit 6 delivers a constant frequency $f_o$ the first input 5 of the frequency divider 4. This can be further transmitted via a line 9 to a tracking circuit 10. The latter possesses an input connection 11 which is connected with the output 8 of the frequency divider 4. A presettable correction signal KS can be fed to the tracking circuit 10.

The output 12 of the tracking circuit 10 leads to an input 13 of a counting circuit 14. A set value SW can be fed to this counting circuit 14. The output 15 of the counting circuit 14 is connected to a reset comparator 16 to which a reference value $W_{soll}$ can be fed. The output 17 of the reset comparator 16 leads via a line 18 to a reset input 19 of the counting circuit 14.

The output 15 of the counting circuit 14 leads further to an interrupt comparator 20 to which a comparison value VW can be fed. Further, the interrupt comparator 20 has an interrupt output 21.

As already mentioned, the sensor 1 directs cycle speed signals n corresponding to the rate of rotation of the crankshaft to the data bus 3. These cycle speed signals n are accordingly available at the second input 7 of the frequency divider 4. The clock circuit 6 feeds the frequency $f_o$ to the first input 5 of the frequency divider 4. The frequency divider 4 forms a pulse frequency $c_o$ at its output 8 resulting in the following:

$$c_o = \frac{f_o}{K} \cdot n.$$

wherein K is a constant specific to the circuit. Since the clock circuit 6 presets a constant frequency $f_o$, the pulse frequency $c_o$ can be changed by variation of the cycle speed signal n. Consequently the divider ratio of the frequency divider 4 is adjustable, so that the cycle speed of the following counting circuit 14 can be variably adjusted.

The tracking circuit 10 forms a counting clock $z_t$ from the pulse frequency $c_o$, which counting clock $z_t$ is fed to the input 13 of the counting circuit 14. This is the normal case, i.e. when no correction signal KS occurs which is equal to the pulse frequency $c_o$. If a correction signal composed of a whole positive or negative number KS occurs, the counting clock $Z_t$ is generated in that KS additional pulses are introduced into the pulse frequency $c_o$ in the case of positive KS or a number of pulses corresponding to the amount of KS is suppressed in the case of negative KS. Thus as a result of the occurrence of a correction signal KS, the counting clock $Z_t$ is no longer strictly periodic.

Depending on whether or not the correction signal KS is a positive or negative whole number, a continuous adjustment of the counter reading $z_s$ of the counting circuit 14 is accordingly effected. An increased counting speed is adjusted with a positive whole number and a stopping of the counter is adjusted with a negative whole number, the count acceleration or stopping period depending on the magnitude of the correction signal KS. Thus when there is a positive correction signal KS the counter runs at increased counting speed until it advances by exactly the number that would be the case if no adjustment were made. When there is a negative correction signal KS, the counter remains still until it slows by exactly the number which would be the case if no adjustment were made.

The counter reading $z_s$ at the output 15 of the counting circuit 14 is fed to the reset comparator 16 as can be seen from the drawing and is compared in the latter with the adjustable reference value $W_{soll}$. As soon as the input values formed by the two signals are of the same magnitude a reset pulse is sent on the line 18, so that the counter is reset to its initial value. A determined counter reading can be preset via the set value SW.

The output 15 is further connected to an interrupt comparator 20 which compares the counter reading $z_s$ with a comparison value VW. If there is equality an interrupt signal is sent at the interrupt output 21.

With reference to the detection of the crankshaft angle of the aforementioned internal combustion engine, the cycle speed n of the counting circuit 14 is adjusted in proportion to the rate of rotation. The counter reading $z_s$ is accordingly a measurement for the angle. If the counter is once synchronized to the absolute crankshaft angle (original angle) and the periodicity is adjusted by presetting the reference value $W_{soll}$ in such a way that the counter jumps again to zero or to its set value SW at a 360° original angle (or 720° original angle in crankshafts of four-cycle engines), the counter reading $z_s$ simulates the original angle.

The original angle and angle clock (counter reading) can drift apart as a result of quantization errors, frequency fluctuations of the clock circuit 6 and particularly changes in the rate of rotation of the crankshaft, etc. Therefore a new synchronization must be effected occasionally. This is made possible e.g. by a corresponding correction signal KS at the tracking circuit 10.

An interrupt signal can be produced at the interrupt output 21 by the interrupt comparator 20 by presetting one or more comparison values VW in respective desired crankshaft position angles. In this way desired crankshaft positions can be detected.

Due to its variable cycle speed and the continuous adjustability the counter according to the invention can be used in many areas. E.g. if determined functions are to be triggered periodically, the periodicity can be externally adjusted in a variable manner. The counter counts constantly from 0 to 99, for example, and a function is always to be triggered at counter reading 50 (period). Depending on the selection of the cycle speed the time required by the counter for one period can be preselected as desired.

Due to the continuous adjustability of the counter no intermediate value is left out when there is an adjustment by more than only one unit (counter reading $z_s$) carried out by the tracking circuit 10. To this extent, for example, compare registers can be used for triggering functions. The trigger value ("50" in the example above) is registered in the compare register. The function is triggered as soon as the counter has reached this value. Known counters which are not adjustable in a continuous manner would, e.g. at a counter reading of 48, jump directly from 48 to 52 when adjusted by four units. This means that the value 50 would thus be left out and the function to be triggered would consequently not be triggered.

With reference to the embodiment example for detecting a crankshaft angle discussed in the preceding, the absolute angle $\Phi_{abs}$ can be preset via the set value SW. An angular difference occurring between the original angle and the simulated angle can be compensated for by the correction signal KS. To this extent the correction signal KS offers the possibility of presetting a preset or reset difference $\delta\Phi$. An interrupt triggering angle $\Phi_{int}$ can be preset by the comparison value VW to detect determined crankshaft positions. Since the counter reading $z_s$ corresponds to the current angle $\Phi_{akt}$ an interrupt signal is always sent when $\Phi_{int}=\Phi_{akt}$.

The quantities for adjusting the angle clock (speed n, angle set value $\Phi_{abs}$, preset/reset difference $\delta\Phi$, interrupt triggering angle $\Phi_{int}$) are preferably read in by coupling a parallel bus of a processor building block present in the described control device. The counter reading $z_s$ (current angle value $\Phi_{akt}$) can likewise be read out via this bus. On the other hand, the transmission of the adjusting variables from one control device to another control device is preferably effected via a serial bus.

While the invention has been illustrated and described as embodied in an electronic counter including a frequency divider and counting circuit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

1. An electronic counter for counting a periodic clock signal generated at a preset clock frequency ($f_o$) comprising a clock circuit (6) generating the periodic clock signal at the preset clock frequency ($f_o$), an adjustable frequency divider (4) having an output (8), a first input (5) and a second input (7), said first input of said frequency divider (4) being connected to said clock circuit (6) so as to receive said periodic clock signal and said second input (7) of said frequency divider being connected to receive a cycle speed signal, said frequency divider (4) containing means to produce at the output thereof a pulsed output signal consisting of a plurality of pulses at a divider output frequency ($c_o$), said divider output frequency ($c_o$) being substantially equal to the clock frequency ($f_o$) divided by a factor (T), said factor (T) being equal to a constant (K) depending on said frequency divider (4) and the cycle speed signal;

a tracking circuit 12 connected to the output (8) of said frequency divider (4) to receive said pulsed output signal at the divider output frequency ($c_o$) and having a correction signal input for receiving one of a positive and negative correction signal (KS), said tracking circuit (T) acting to add a number of additional pulses to the pulsed output signal received thereby when said correcting signal is positive and suppressing a number of said pulses of said pulsed output signal from the frequency divider when said correcting signal is negative; and a counting circuit (14) having an output and connected to the tracking circuit 12 to count said pulses received from the tracking circuit and to generate a counter reading ($z_s$).

2. An electronic counter as defined in claim 1, wherein said counting circuit has an input for receiving a set value signal (SW) and contains means for resetting the counter reading ($z_s$) according to the set value signal (SW).

3. An electronic counter as defined in claim 2, further comprising a reset comparator 16 connected to the counting circuit (14) to receive the counter reading ($z_s$) therefrom and containing means for generating a reset pulse which generates the reset pulse when the counter reading ($z_s$) is identical to a preset reference value ($W_{soll}$), said reset comparator being connected to said counting circuit (14) to receive said reset pulse therefrom.

4. An electronic counter as defined in claim 1, further comprising an interrupt comparator (20) connected with said counter circuit (14) to receive the counter reading ($z_2$) and containing means for generating an interrupt pulse which generates the interrupt pulse when the counter reading ($z_s$) is identical to a prest comparison value (VW).

5. An electronic counter as defined in claim 1, further comprising a rotational angle transmitter (2) for measuring a rotational speed of a rotating unit (ru) and generating the cycle speed signal fed to the second input (7) of the frequency divider (6), said cycle speed signal depending on the rotational speed of the rotating unit.

6. An electronic counter as defined in claim 5, wherein the rotating unit is a crankshaft of an internal combustion engine.

7. An electronic counter as defined in claim 6, further comprising a control device for an internal combustion engine for simulating a crankshaft angle of the crankshaft.

8. An electronic counter as defined in claim 3, wherein the reset comparator resets the counter reading to "0" when the crankshaft angle is one of 360° and 720°.

* * * * *